United States Patent
Abrahamson

(10) Patent No.: US 10,183,529 B2
(45) Date of Patent: Jan. 22, 2019

(54) AXLE WHEEL END AXIAL THRUST ASSEMBLY

(71) Applicant: Koyo Bearings North America LLC, Westlake, OH (US)

(72) Inventor: Scott Abrahamson, Piedmont, SC (US)

(73) Assignee: KOYO BEARINGS NORTH AMERICA LLC, Westlake, OH (US)

( * ) Notice: Subject to any disclaimer, the term of this patent is extended or adjusted under 35 U.S.C. 154(b) by 0 days.

(21) Appl. No.: 15/519,386

(22) PCT Filed: Oct. 22, 2015

(86) PCT No.: PCT/US2015/056954
§ 371 (c)(1),
(2) Date: Apr. 14, 2017

(87) PCT Pub. No.: WO2016/065168
PCT Pub. Date: Apr. 28, 2016

(65) Prior Publication Data
US 2017/0232794 A1 Aug. 17, 2017

Related U.S. Application Data

(60) Provisional application No. 62/079,037, filed on Nov. 13, 2014, provisional application No. 62/067,165, filed on Oct. 22, 2014.

(51) Int. Cl.
*B60B 35/14* (2006.01)
*B60K 17/16* (2006.01)
(Continued)

(52) U.S. Cl.
CPC .............. *B60B 35/14* (2013.01); *B60B 35/12* (2013.01); *B60B 35/16* (2013.01); *B60B 35/18* (2013.01);
(Continued)

(58) Field of Classification Search
CPC ......... B60B 35/14; B60B 35/18; B60B 35/16; B60B 2380/316; F16C 19/30;
(Continued)

(56) References Cited

U.S. PATENT DOCUMENTS

| 3,283,843 A | 11/1966 | Runyan |
| 9,593,757 B2 | 3/2017 | Downs et al. |
| 2014/0339888 A1* | 11/2014 | Downs .................... B60B 35/18 301/137 |

FOREIGN PATENT DOCUMENTS

| EP | 1103389 A2 | 5/2001 |
| WO | 2008/110938 A2 | 9/2008 |
| WO | 2014/074507 A1 | 5/2014 |

OTHER PUBLICATIONS

International Search Report and Written Opinion for PCT/US2015/056954 dated Feb. 3, 2016.

* cited by examiner

*Primary Examiner* — S. Joseph Morano
*Assistant Examiner* — Jean W Charleston
(74) *Attorney, Agent, or Firm* — Nelson Mullins Riley & Scarborough LLP

(57) ABSTRACT

An axle assembly for a vehicle including a differential assembly, a first axle tube extending outwardly from a first side of the differential assembly and defining an axle bore, a first axle shaft rotatably received in the first axle tube, and defining an annular groove extending radially inwardly from its outer surface, a retainer nut axially fixed to a distal end of the first axle tube, the retainer nut having an annular flange extending inwardly into the axle bore and defining an annular outer raceway, a snap ring received in the annular groove, and an axial thrust component disposed in the axle bore of the first axle tube between the snap ring and the outer raceway of the retainer nut.

13 Claims, 19 Drawing Sheets

(51) Int. Cl.
  *B60B 35/12* (2006.01)
  *B60B 35/18* (2006.01)
  *F16C 19/54* (2006.01)
  *F16C 19/26* (2006.01)
  *F16C 19/30* (2006.01)
  *F16C 19/44* (2006.01)
  *B60B 35/16* (2006.01)

(52) U.S. Cl.
  CPC ............ B60K 17/165 (2013.01); F16C 19/26 (2013.01); F16C 19/30 (2013.01); F16C 19/44 (2013.01); F16C 19/545 (2013.01); *B60B 2310/305* (2013.01); *B60B 2310/307* (2013.01); *B60B 2310/316* (2013.01); *B60B 2380/16* (2013.01); *F16C 2361/31* (2013.01)

(58) Field of Classification Search
  CPC ........ F16C 19/545; F16C 19/44; F16C 19/26; F16C 2361/31; B60K 17/165
  USPC .............................................. 301/124.1, 137
  See application file for complete search history.

AXLE WHEEL END AXIAL THRUST ASSEMBLY

FIELD OF THE INVENTION

The present disclosure relates generally to solid axle assemblies for vehicles and, more specifically, to bearing assemblies that are utilized on the wheel end sections of such solid axle assemblies.

BACKGROUND

Salisbury solid axles are often used in passenger trucks and sport utility vehicles. Salisbury axles are unique in the fact that the axle transmits driving torque to the wheel as well as carries and transmits both radial and axial thrust loads.

As shown in FIG. 1, many existing wheel end bearings 10 for use with solid vehicle axles include an outer cup 11 that is press-fit into the corresponding axle tube 12 to maintain location and define an outer raceway for the corresponding rollers 13. No additional retention features are required for this type of wheel end bearing 10 in that the bearing only handles radial loads. Lubrication for wheel end bearing 10 is provided by the same oil sump that provides lubrication to the differential gears 15 (FIG. 2) that are disposed at the center section of the axle assembly. To maintain lubrication, an oil seal 14 is press-fitted outboard of the wheel end bearing in axle tube 12.

Radial wheel end loads are handled primarily at wheel end bearing 10, whereas axial loads are not. Rather, as best seen in FIGS. 2 through 4, axial loads are transmitted along axle shaft 16. Typically, "C Locks" 18 are utilized to resist outward axial loading and a cross shaft 20 disposed between the opposing axle shafts in a housing 25 of differential 17 absorbs inward axial loading. A typical C Lock includes a heavy annular lock ring 19 received in an annular groove 21 formed on the inboard end of a corresponding axle shaft 16. In the fully assembled configuration (FIG. 3), annular lock ring 19 is further received in an annular recess 23 formed in an end face of a corresponding differential gear 15. During normal operations, inward axial loading has a higher magnitude than outward axial loading due to vehicle dynamics during cornering. When outward axial load on axle shaft 16 occurs, axle shaft 16 attempts to move outwardly from axle tube 12, which causes annular lock ring 19 of the corresponding C Lock 18 to push on the corresponding differential side gear 15. Ultimately, the outward axial load is dispersed through differential carrier bearings 24 to housing 25 of the differential, as shown in FIG. 4.

When inward axial loading is generated from vehicle cornering, an end face 27 of axle shaft 16 thrusts against differential cross shaft 20, as best seen in FIG. 2. In turn, the inward axial loading is transmitted through differential carrier bearings 24, as shown in FIG. 4.

The present invention recognizes and addresses considerations of prior art constructions and methods.

SUMMARY

One embodiment of an axle assembly for a vehicle includes a differential assembly, a first axle tube extending outwardly from a first side of the differential assembly, the first axle tube including a proximal end adjacent the differential assembly, an opposite distal end, and an axle bore extending therebetween, a first axle shaft rotatably received in the first axle tube, the first axle shaft including a proximal end disposed in the differential assembly, an opposite distal end extending outwardly from the distal end of the first axle shaft, and an annular groove extending radially inwardly from its outer surface, a retainer nut axially fixed to the distal end of the first axle tube, the retainer nut having an annular flange extending inwardly into the axle bore and defining an annular outer raceway, a snap ring received in the annular groove of the first axle shaft, and an axial thrust component disposed in the axle bore of the first axle tube between the snap ring and the outer raceway of the retainer nut.

Another embodiment of an axle assembly for a vehicle includes a differential assembly, a first axle tube extending outwardly from a first side of the differential assembly, the first axle tube including a proximal end adjacent the differential assembly, an opposite distal end, and an axle bore extending therebetween, a first axle shaft rotatably received in the first axle tube, the first axle shaft including a proximal end disposed in the differential assembly, an opposite distal end extending outwardly from the distal end of the first axle shaft, and an annular groove extending radially inwardly from its outer surface, a retainer nut axially fixed to the distal end of the first axle tube, the retainer nut having an annular flange extending inwardly into the axle bore, a thrust cup axially fixed to an inner bore of the retainer nut, the thrust cup defining an annular outer raceway, a snap ring received in the annular groove of the first axle shaft, an annular inner raceway disposed in the axle bore of the first axle tube adjacent the snap ring, and an axial thrust component disposed in the axle bore of the first axle tube between the inner raceway and the outer raceway.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
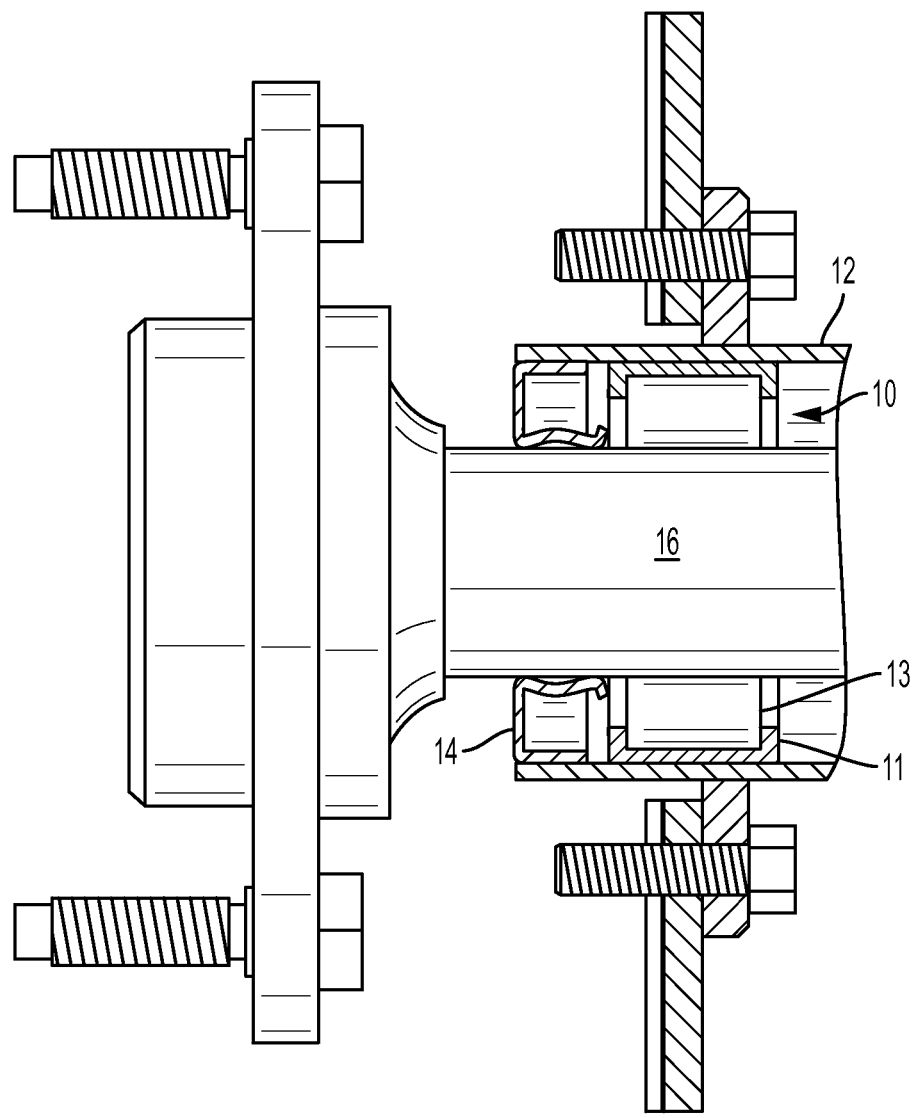
FIG. 1 is a partial cross-sectional view of a wheel end section of a prior art solid axle assembly.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
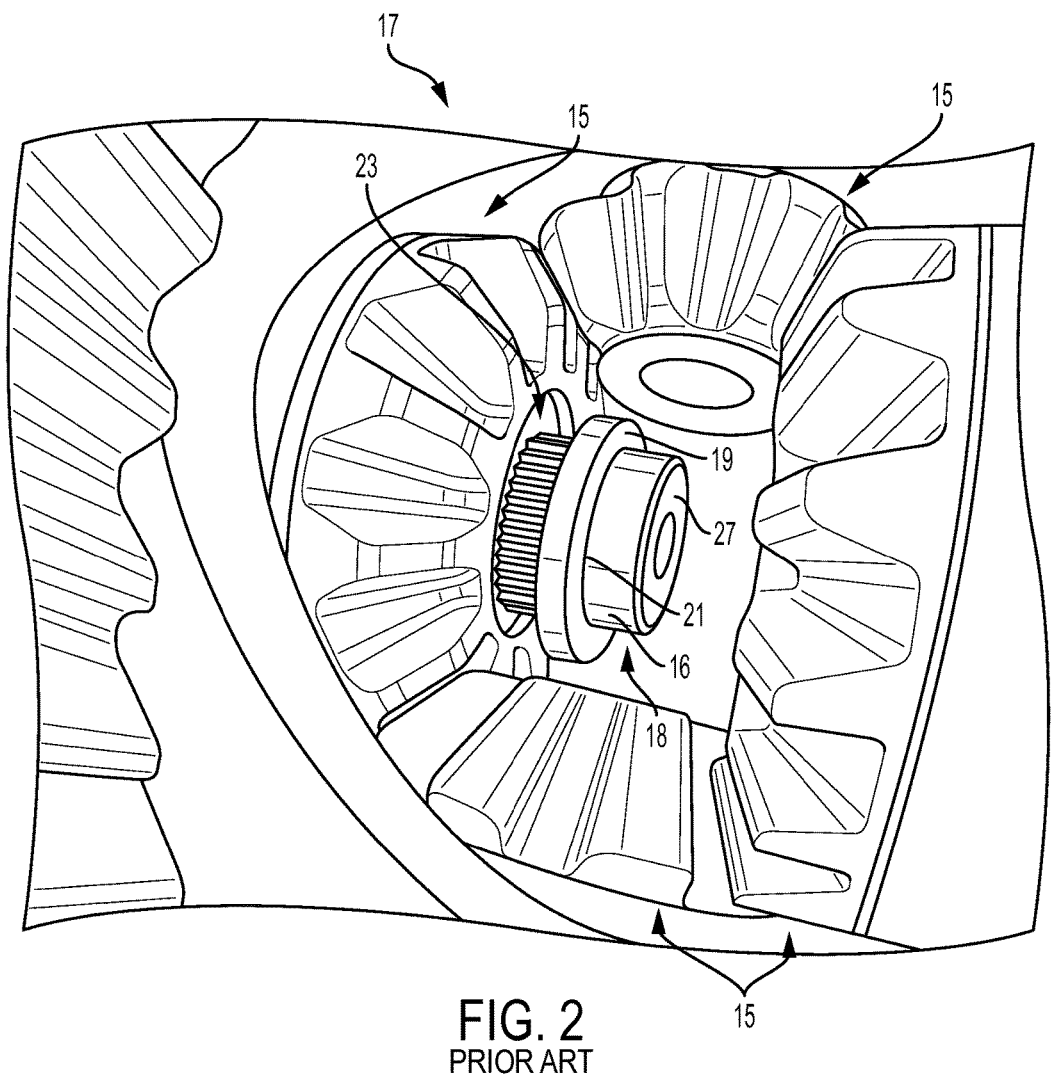
FIG. 2 is a partial perspective view of the prior art axle shaft shown in FIG. 1 and a corresponding differential.

Referring now to FIGS. 5A through 5D, a wheel end axial thrust assembly 100 for use with a solid vehicle axle in accordance with an embodiment of the present disclosure includes a radial bearing assembly 140, a snap ring 136, a thrust bearing assembly 130, and a retainer nut 110 disposed on the wheel end of an axle shaft 106 and corresponding axle tube 102, as discussed in greater detail below. Axial thrust assembly 100 handles axial thrust forces that act on axle shaft 106 in the outward direction, thereby obviating the need to utilize C-locks 18 (FIGS. 2 and 3) that are typically found on existing solid axle assemblies.

Figure 5A:
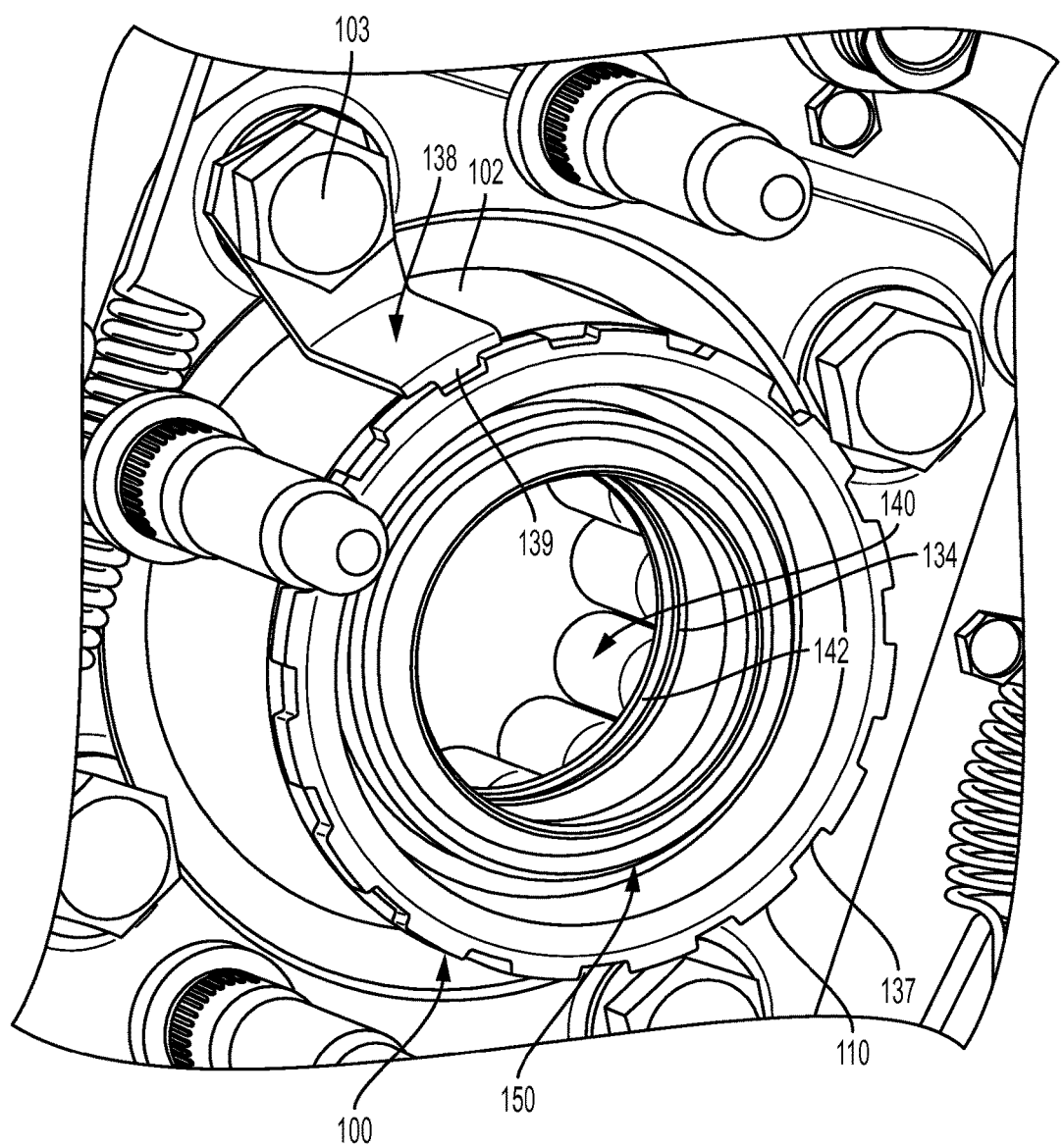
FIG. 5A is a perspective view of an axial thrust assembly in accordance with a first embodiment of the present invention, for use with a solid axle assembly.
Figure 5B:
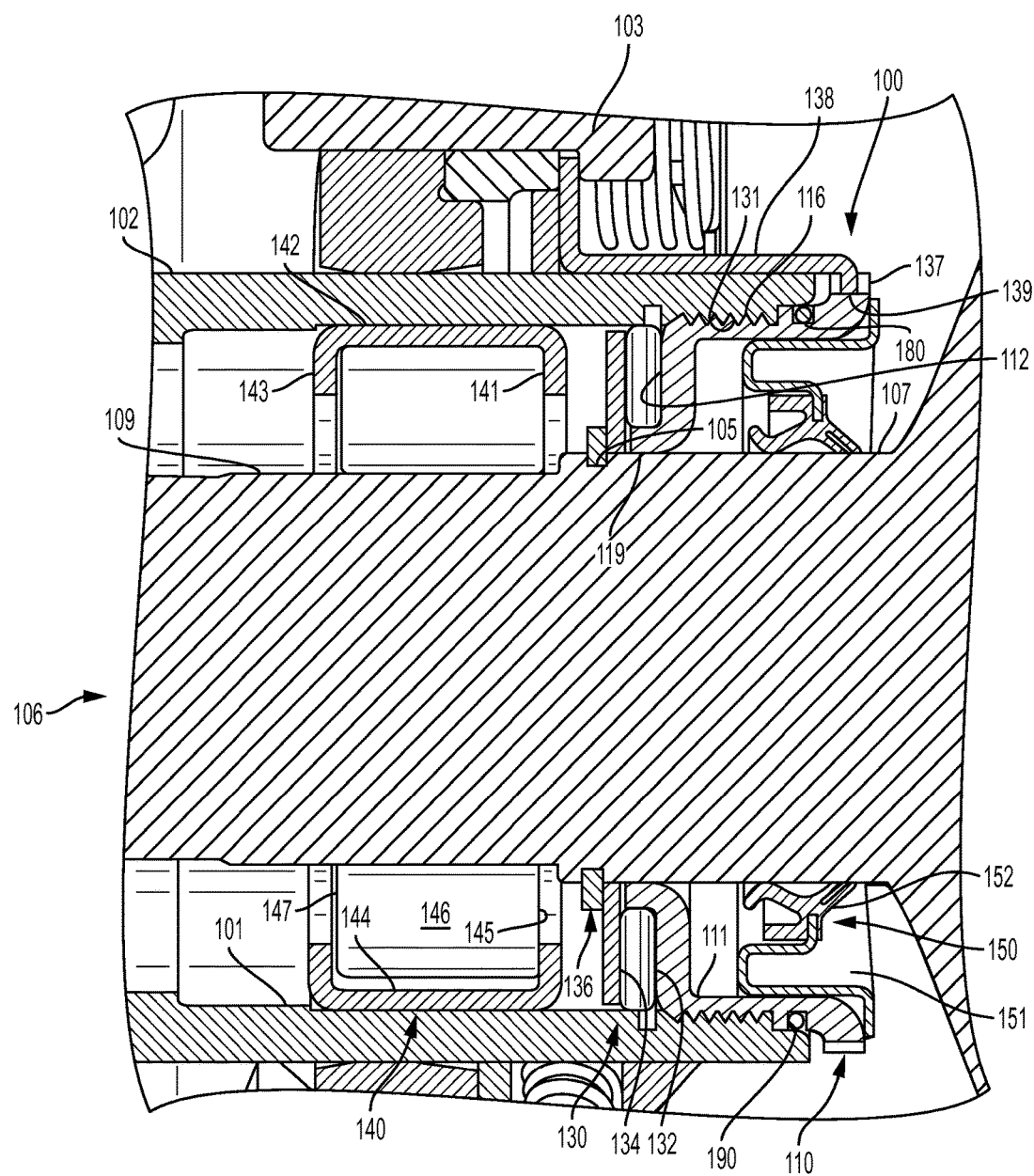
FIG. 5B is a partial cross-sectional view of a wheel end section of a solid axle assembly including the axial thrust assembly shown in FIG. 5A.
Figure 5C:
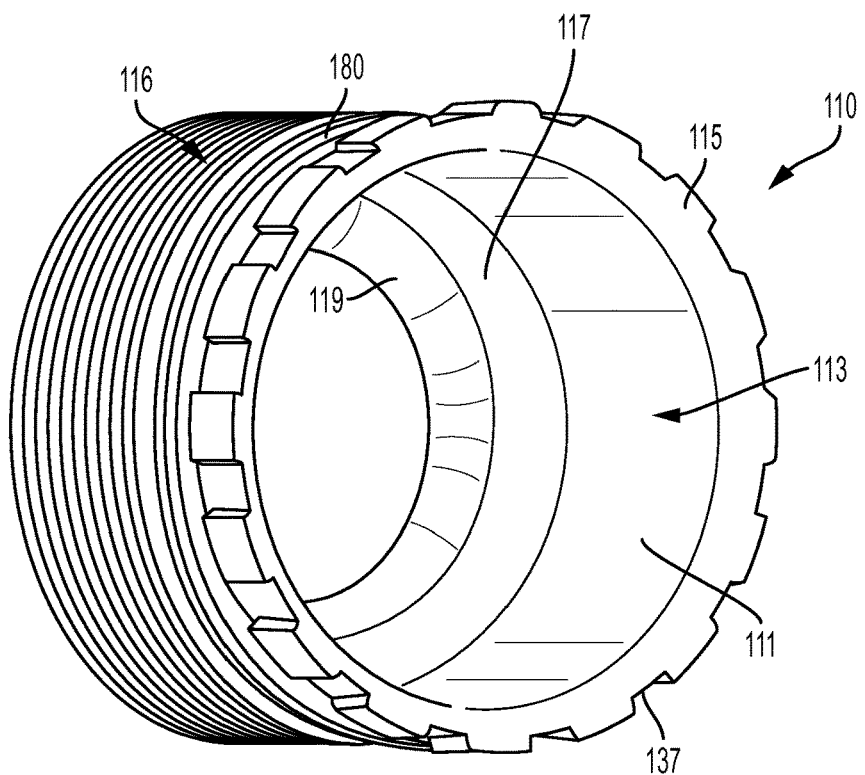
FIG. 5C is a perspective view of a retainer nut of the axial thrust assembly shown in FIGS. 5A and 5B.
Figure 5D:
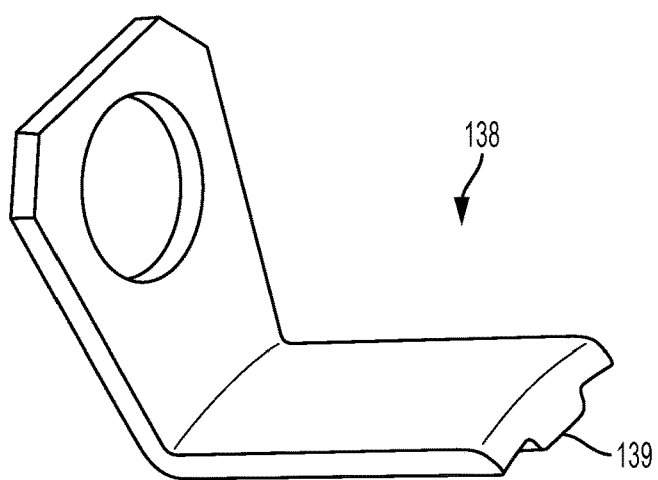
FIG. 5D is a perspective view of a ring lock of the axial thrust assembly shown in FIGS. 5A and 5B.

As noted above, radial bearing assembly 140 includes an outer cup 142 that defines a cylindrical outer race 144 for needle rollers 146. A first annular flange 141 and second annular flange 143 extend radially-inwardly from opposite ends of outer race 144. Outer cup 142 is preferably a machined and ground component made from a carburized grade of steel to enhance control of the press-fit, bearing clearances, and increase allowable hoop stresses. As best seen in FIG. 5B, outer cup 142 is received in a bore 101 of axle tube 102. Although radial bearing assembly 140 does not handle either inward or outward axial thrust forces that act on axle shaft 102, outer cup 142 is preferably press-fit into bore 101 to maintain the desired position within axle tube 102. As well, outer cup 142 is positioned within bore 101 of axle tube 102 so that an inner race for the plurality of rollers 146 is formed by a narrowed portion of axle shaft 106, as discussed in greater detail below.

Each needle roller 146 includes a cylindrical rolling surface extending between a first end face 145 and a second end face 147. Each first and second end face 145 and 147 is transverse to a longitudinal center axis of the corresponding needle roller 146. As such, when needle rollers 146 are disposed between outer cup 142 and the outer surface of axle shaft 106, first end faces 145 and second end faces 147 are parallel to first annular flange 141 and second annular flange 143 of outer cup 142.

Snap ring 136 is annular in shape and is received in an annular groove 105 on axle shaft 106. Annular groove 105, and therefore snap ring 136, is disposed outboard of radial bearing assembly 140 on an enlarged end portion 107 of axle shaft 106. The diameter of enlarged end portion 107 of axle shaft 106 is greater than the diameter of the inboard portion 109 that forms the remainder of axle shaft 106. The increased diameter helps to minimize any additional stresses due to the formation of annular groove 105 to receive snap ring 136 and its resistance to outwardly directly axial thrust forces that act on axle shaft 106. A split (not shown) in snap ring 136 allows it to be slid over the transition between the inboard and outboard portions of axle shaft 106.

A thrust washer 134 is preferably disposed outboard of, and adjacent to, an end face of snap ring 136 and forms an inner thrust race for axial bearing assembly 130. An outermost edge and innermost edge of thrust washer are smaller than the inside diameter of axle tube 102 and larger than the outside diameter of the axle shaft's enlarged end portion 107, respectively, so that thrust washer 134 is free to rotate about axle shaft 106. As noted, thrust washer 134 serves as an inner thrust race for thrust bearing 130 and, therefore, its plurality of needle rollers 132. An outer thrust race 112 of thrust bearing 130 is formed by a portion of retainer nut 110, as discussed in greater detail below.

Retainer nut 110 is threadedly received on the wheel end of axle tube 102. Specifically, a portion 116 of the outer surface of retainer nut's body 111 is correspondingly threaded to a portion 131 of the axle tube's bore 101. Preferably the tolerances between the male threads 116 of retainer nut 110 and female threads 131 of axle tube 102, when engaged, are such that "backlash" is prevented. Specifically, the ideal tolerances between the threads allows for ease of threadedly connecting the components, but minimizes the possibility of impact or fretting wear. As well, in some embodiments an interference fit between the threads may be used in which the female threaded component, the axle tube, deforms slightly when accepting the male threaded component, the retainer nut.

Once retainer nut 110 and axle tube 102 are threadedly engaged, a ring lock 138 is used to non-rotatably secure retainer nut 110 in the desired position. Specifically, a tab 139 of ring lock 138 engages one of a plurality of lock notches 137 formed on retainer nut 110. Cylindrical body 111 of retainer nut 110 includes an open end defining a bore 113, a first radial flange 115 depending outwardly from the open end of cylindrical body 111, a second radial flange 117 depending inwardly from the end of cylindrical body 111, opposite its open end, and an axial flange 119 depending inwardly from the inner perimeter of second radial flange 117. As best seen in FIG. 5, axial flange 119 is concentric with cylindrical body 111, thereby defining an abutment surface for the innermost end faces of the plurality of needle rollers 132 of thrust bearing 130. An innermost end face of the retainer nut's second radial flange 117 serves as outer thrust race 112 for the thrust bearing's plurality of needle rollers 132. Additionally, first radial flange 115 defines a plurality of lock notches 137 on its outer perimeter.

As shown in FIG. 5B, an annular groove 180 is defined in the outer surface of the retainer nut's cylindrical body 111, adjacent first radial flange 115. An O-ring 190 is received in annular groove 180 and forms a seal with the inner surface of axle tube 102 to help retain lubricating fluids therein. Additionally, an oil seal 150 including an annular body portion 151 and annular sealing member 152 is received in bore 113 defined by cylindrical body of retainer nut 110 to help retain lubricating fluids in axle tube 102. Specifically, annular body 151 is press-fit in bone 113 so that sealing member 152 contacts the outer surface of axle shaft 106.

During assembly, retainer nut 110 is rotated so that it moves inwardly into axle rube 102 until the inner end of the axle shaft bumps differential cross shaft 20, as noted above. Next, retainer nut 110 is unthreaded from axle tube 102 to provide the desired amount of clearance between the end of the axle shaft and the differential cross shaft 20 when axle shaft 106 is in its outermost position. In the present case, retainer nut 110 is rotated so that tab 139 of ring lock 138 is able to engage the subsequent lock notch 114 on the first radial flange 115 of retainer nut 110, next to the notch that is engageable when axle shaft 106 abuts the differential cross shaft 20. Ring lock 138 is then secured in position with a mounting bolt 103 to lock retainer nut 110 and, therefore, the axial thrust assembly components in place.

As best seen in FIG. 5B, during vehicle operations, axial thrust forces acting on axle shaft 106 in the outward direction are transferred to retainer nut 110 by way of snap ring 136. Specifically, snap ring 136 moves outwardly with axle shaft 106 as it is received in annular groove 105 thereof. The outboard end face of snap ring 136 abuts thrust washer 134, which acts as inner thrust race of thrust bearing 130. As such, thrust washer 134 transfers the thrust force to outer thrust race 112, and therefore retainer nut 110, by way of the thrust bearing needle rollers 132. In turn, retainer nut 110 transfers the outwardly directed axial thrust force to axle tube 130 by way of the threaded connection therebetween. As previously discussed, inwardly directed axial thrust forces acting on axle shaft 150 are transferred from the innermost end of axle shaft 120 to cross shaft 20 (FIGS. 3 and 4) of the axle's differential.

Figure 6A:
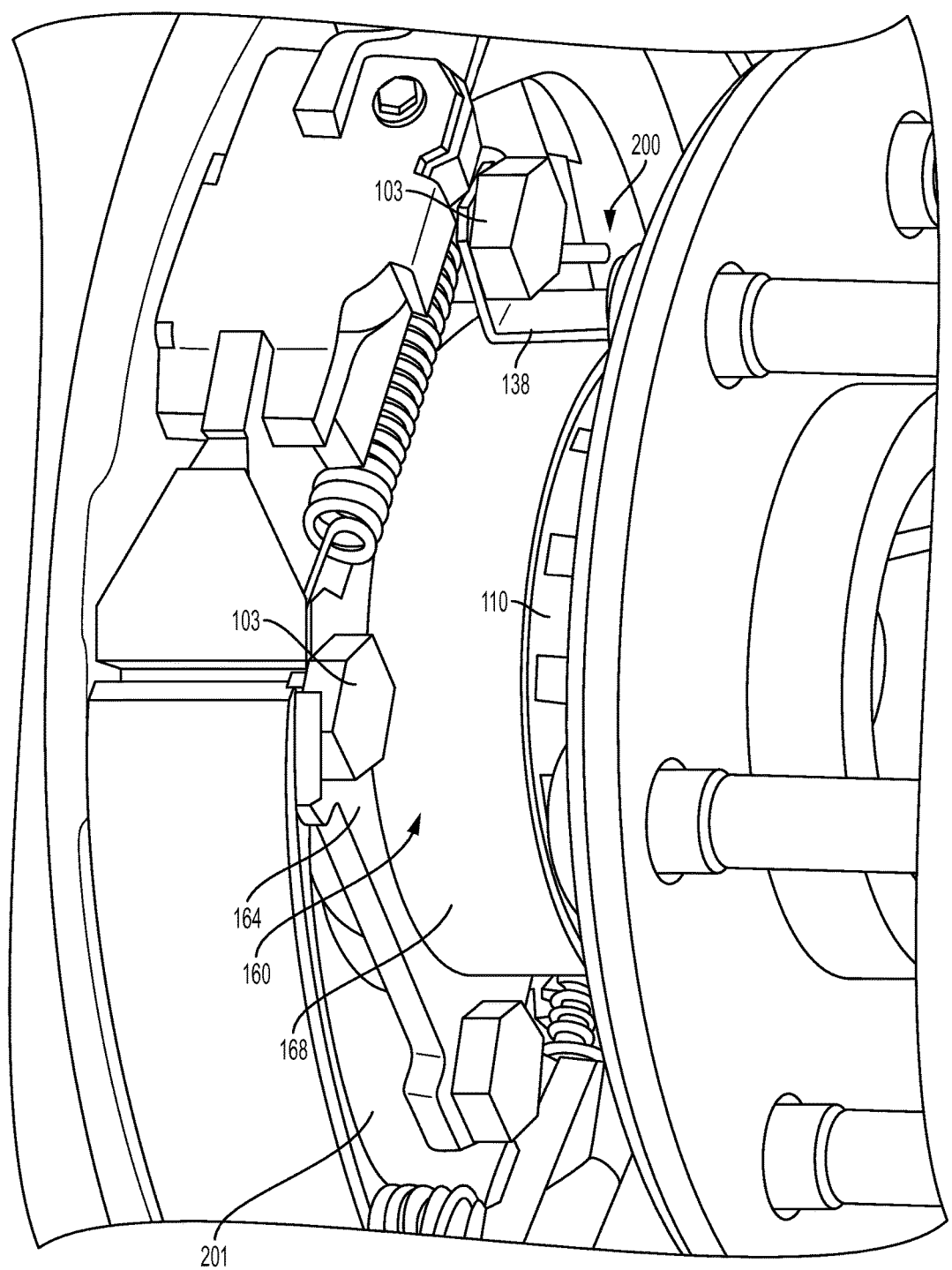
FIG. 6A is a perspective view of an axial thrust assembly in accordance with a second embodiment of the present invention, used with a solid axle assembly.
Figure 6B:
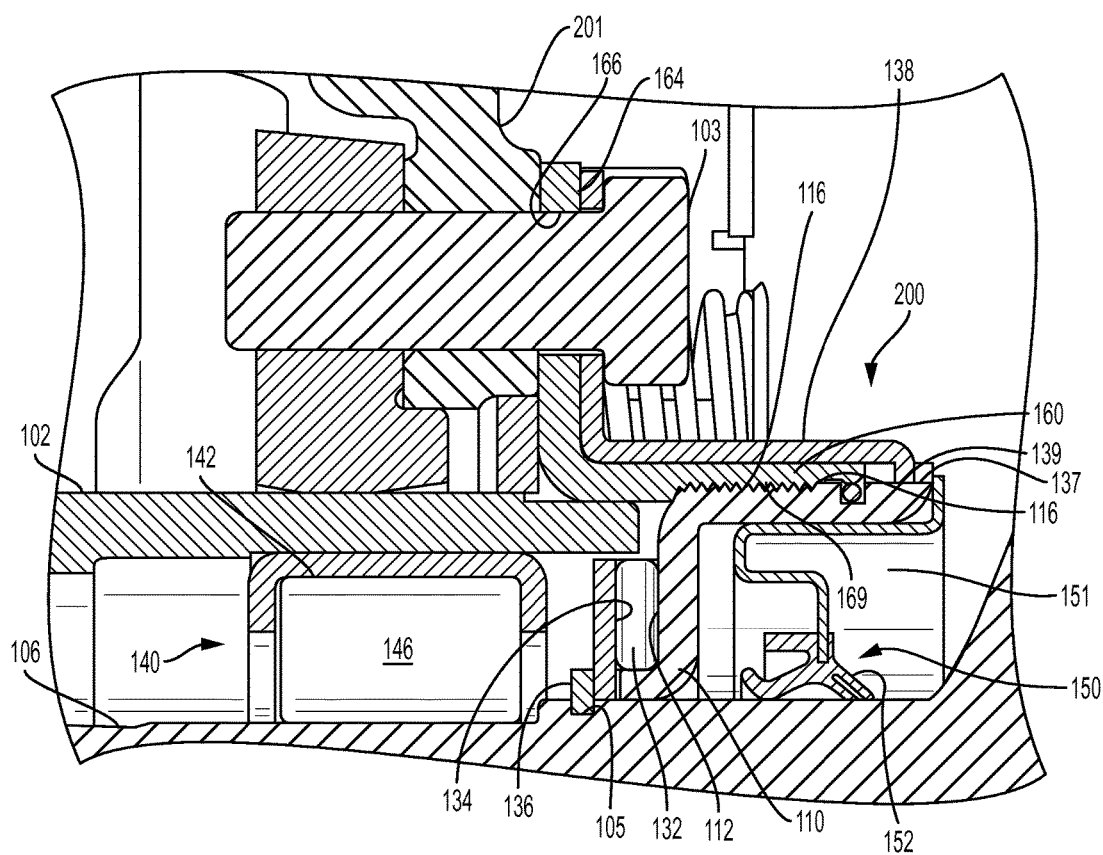
FIG. 6B is a partial cross-sectional view of a wheel end section of a solid axle assembly including the axial thrust assembly shown in FIG. 6A.
Figure 6C:
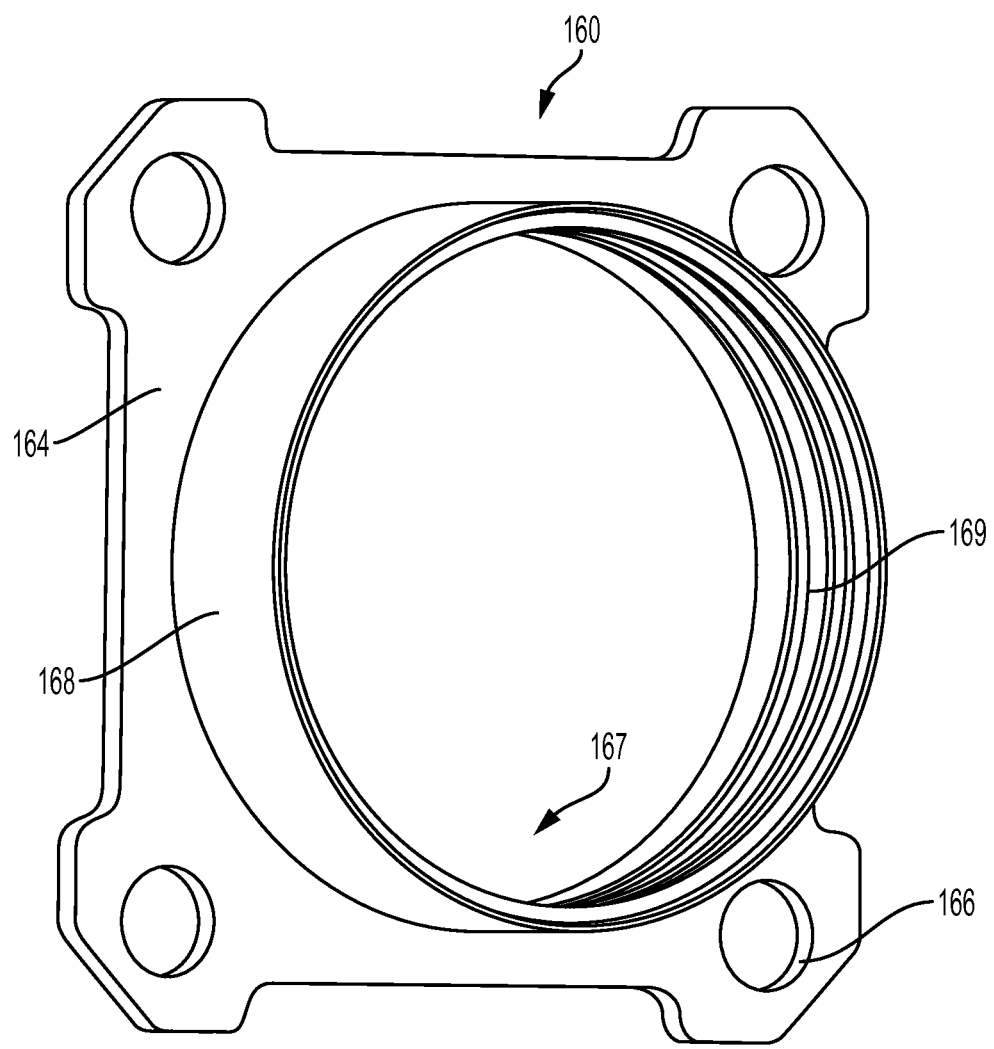
FIG. 6C is a perspective view of a flange plate of the axial thrust assembly shown in FIGS. 6A and 6B.

In an alternate embodiment of a wheel end axial thrust assembly 200 in accordance with the present disclosure, shown in FIGS. 6A through 6C, a threaded flange plate 160 is utilized to secure retainer nut 110 in the desired position with respect to axle tube 102. Flange plate 160 includes a base plate 164 defining a plurality of fastener apertures 166, and an axially-extending cylindrical body 168 that defines a central bore 167 in base plate 164. As shown, body 168 includes a portion 169 of its inner surface that is correspondingly threaded to threaded portion 116 of retainer nut 110. Flange plate 160 is mounted to brake assembly 201 by using brake assembly mounting bolts 103 that pass through fastener apertures 166. As best seen in FIG. 6B, flange plate 160 acts as an axle tube extension and hardened threads 169 receive threaded portion 116 of retainer nut 110. The remaining components of this embodiment function similarly to the previously discussed embodiment, shown in FIGS. 5A and 5B, which includes an axle tube with a threaded inner diameter. This alternate embodiment allows for the threaded flange plate 160 to be removed and replaced if the threads become damaged, yet preferably allows axle shaft 106 to be removed without removal of threaded flange 160.

In yet another embodiment of an axial thrust assembly 300 in accordance with the present disclosure, a threaded ring insert 170 is used to secure threaded retainer nut 110 to axle tube 102. As best seen in FIG. 7B, ring insert 170 includes an annular body 171 and a plurality of flexible tabs 175 extending rearwardly therefrom. Each tab 175 includes a threaded inner surface 172 and a lip 176 extending radially-outwardly from its distal end. The plurality of lips 176 define an annular boss 174. As well, each tab 175 has an increasing taper from its proximal end adjacent annular body 171 to its distal end.

Figure 7A:
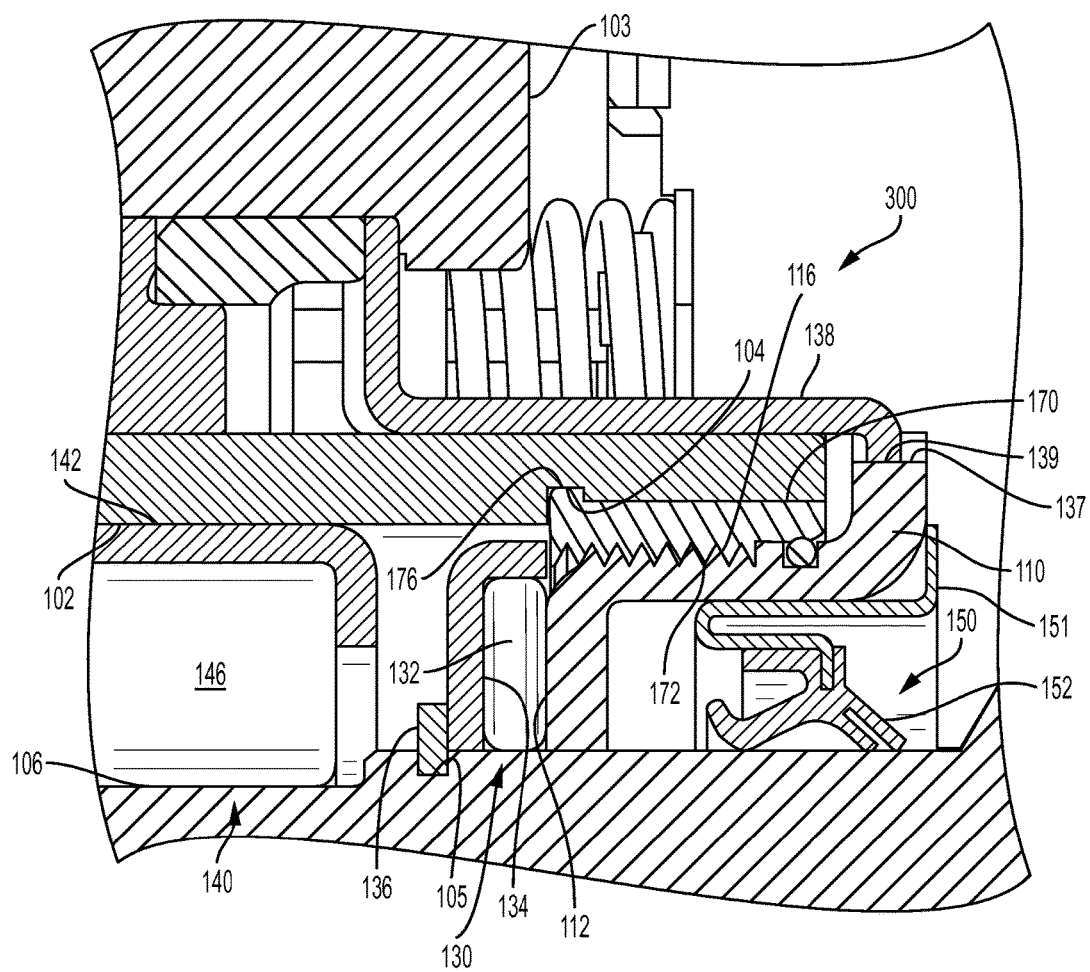
FIG. 7A is a partial cross-sectional view of a wheel end section of a solid axle assembly including a third embodiment of an axial thrust assembly in accordance with the present invention.
Figure 7B:
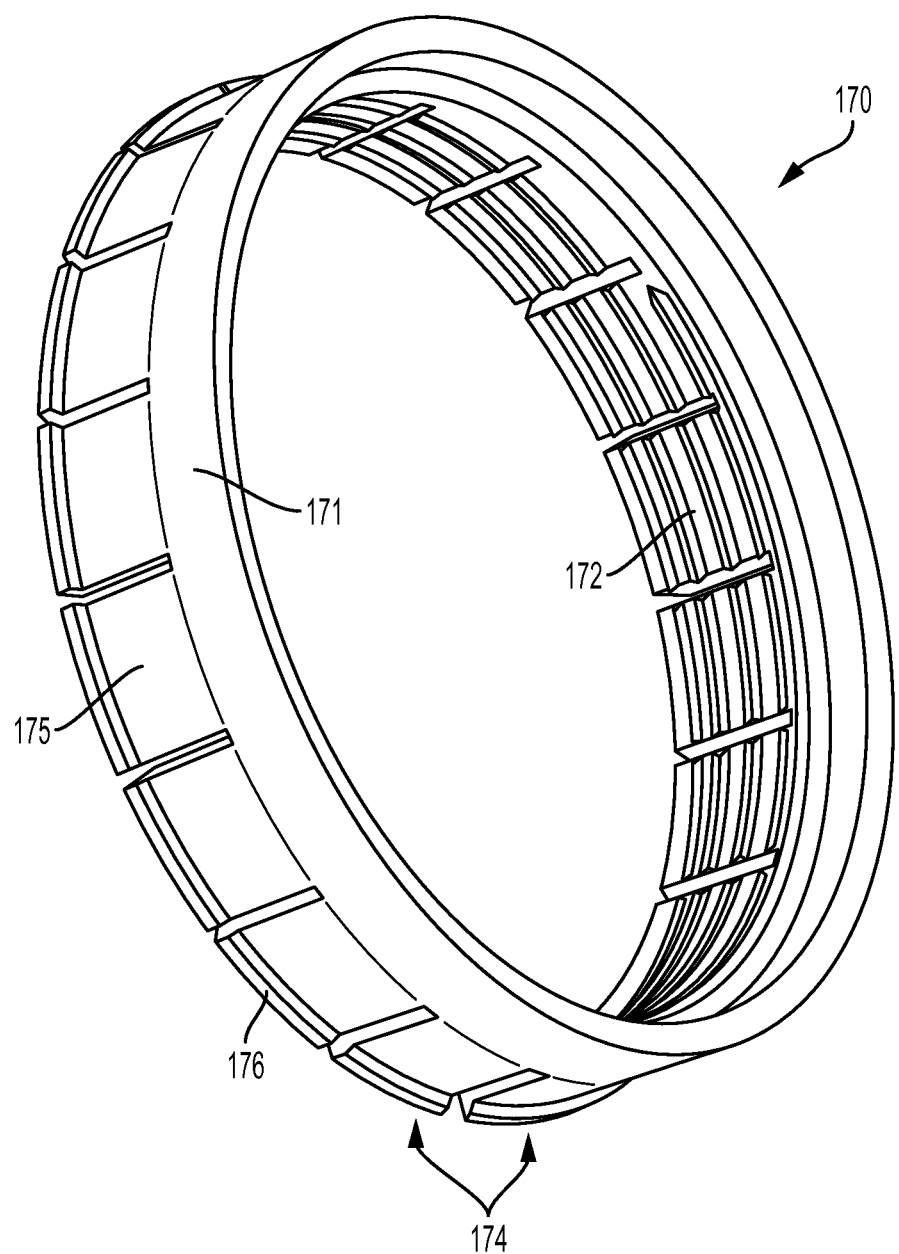
FIG. 7B is a perspective view of a ring insert of the axial thrust assembly shown in FIG. 7A.

As shown in FIG. 7A, the tapered and expandable threaded ring insert 170 is press-fit into the end of axle tube 102 so that the lip of each tab 175 is adjacent annular groove 104 of axle tube 102. As previously noted, the threaded inside diameter of ring insert 170 is tapered so that when the threaded portion 116 of retainer nut 110 is screwed into the ring insert, each tab 175 expands outwardly. As such, each lip 176 of each tab 175 extends outwardly into annular groove 104 formed on the inner surface of axle tube 102. As annular boss 174 expands into groove 104 of the axle tube, the retainer nut 110 and insert 170 become axially fixed within the axle tube.

Threaded retainer nut 110 may be screwed into threaded insert 170 until the innermost end of axle shaft 106 comes in contact with differential cross shaft 20 (FIG. 3) and, similar to the previously discussed embodiments, may be unscrewed one lock notch 137 of retainer nut 110 and locked in place with ring lock 138. The expanding threaded insert 170 allows for a constant spring pressure on the retainer nut to maintain position and eliminate any backlash and potential fretting from vibrations while driving the vehicle.

Figure 8A:
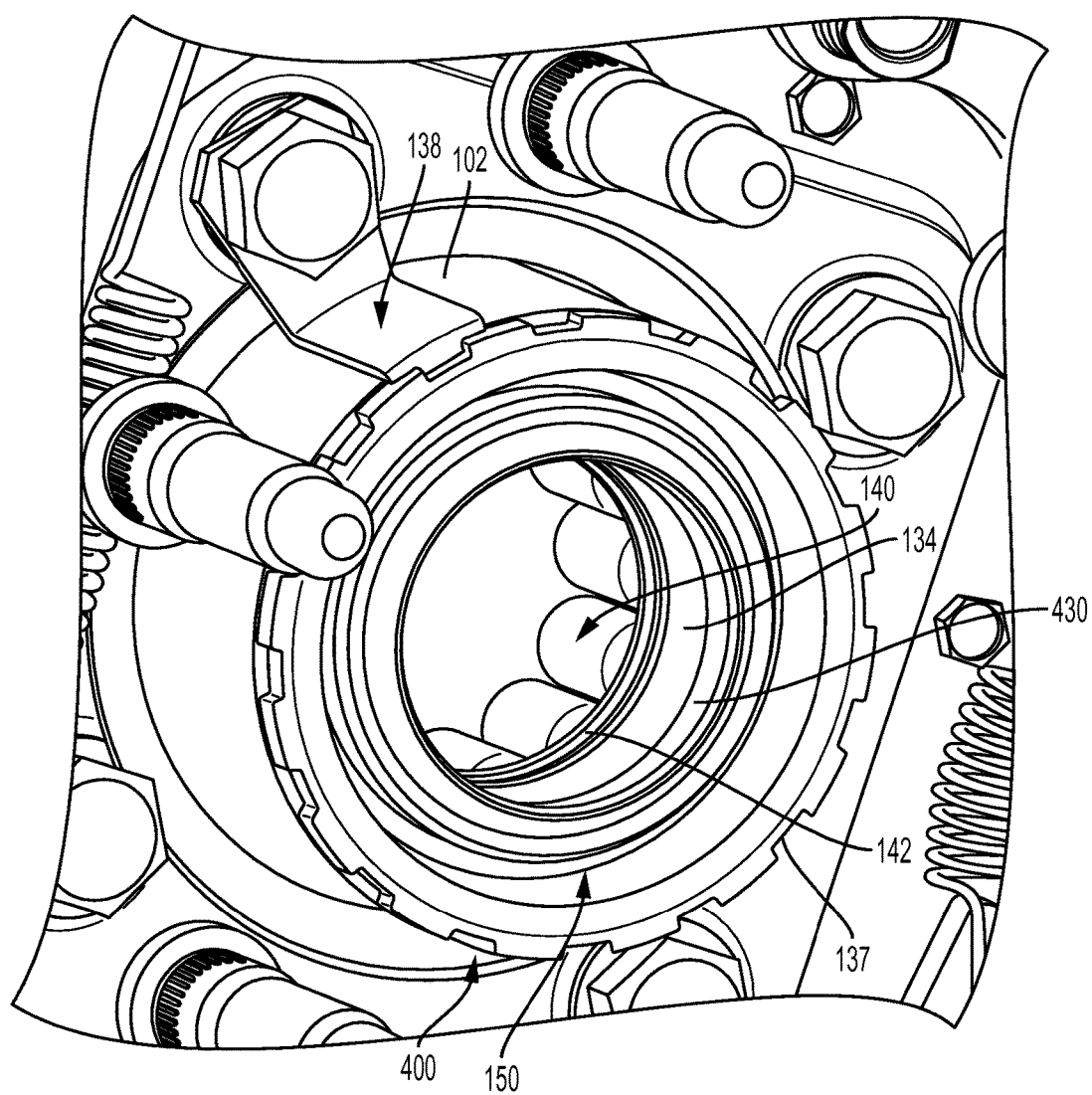
FIG. 8A is a perspective view of an axial thrust assembly in accordance with a fourth embodiment of the present invention, for use with a solid axle assembly.
Figure 8B:
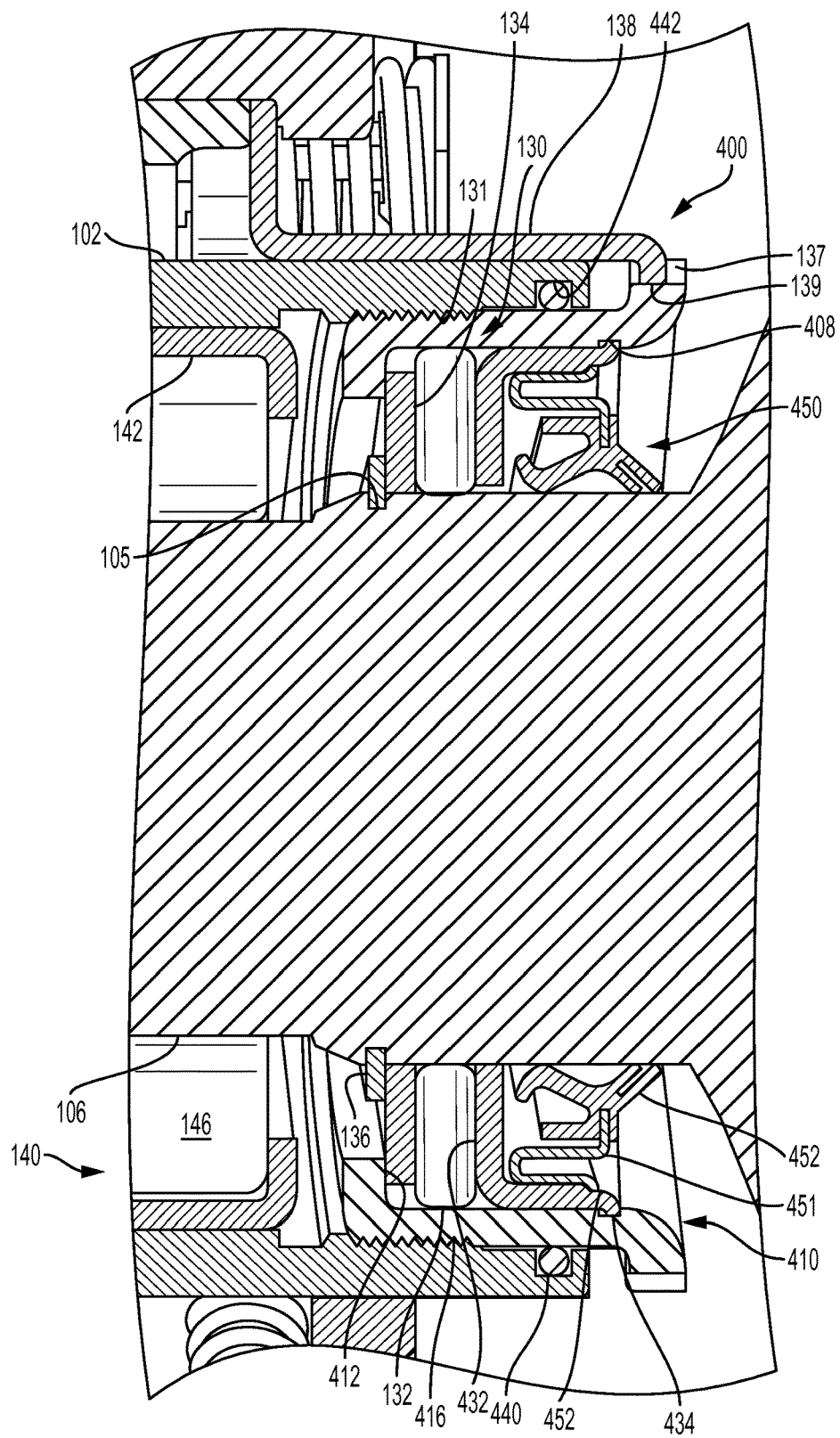
FIG. 8B is a partial cross-sectional view of a wheel end section of a solid axle assembly including the axial thrust assembly shown in FIG. 8A.
Figure 8C:
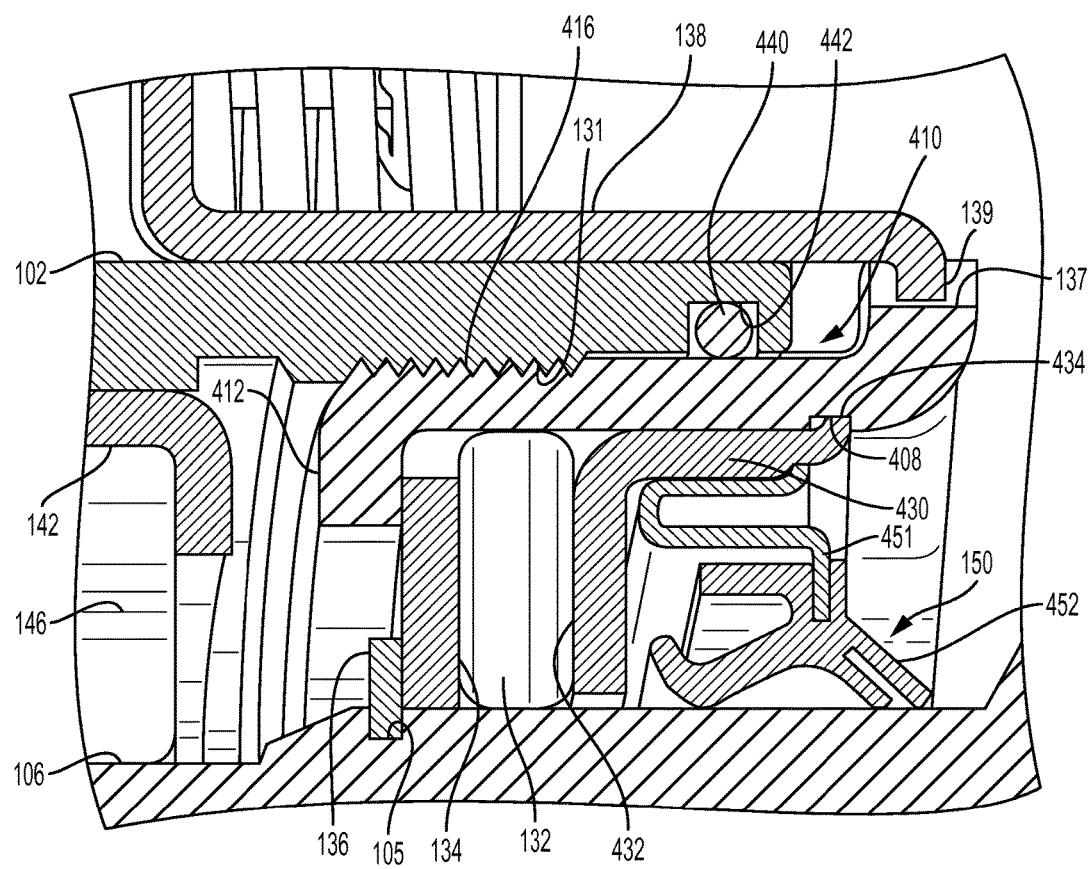
FIG. 8C is a partial cross-sectional view of a wheel end section of a solid axle assembly including the axial thrust assembly shown in FIG. 8A.
Figure 8D:
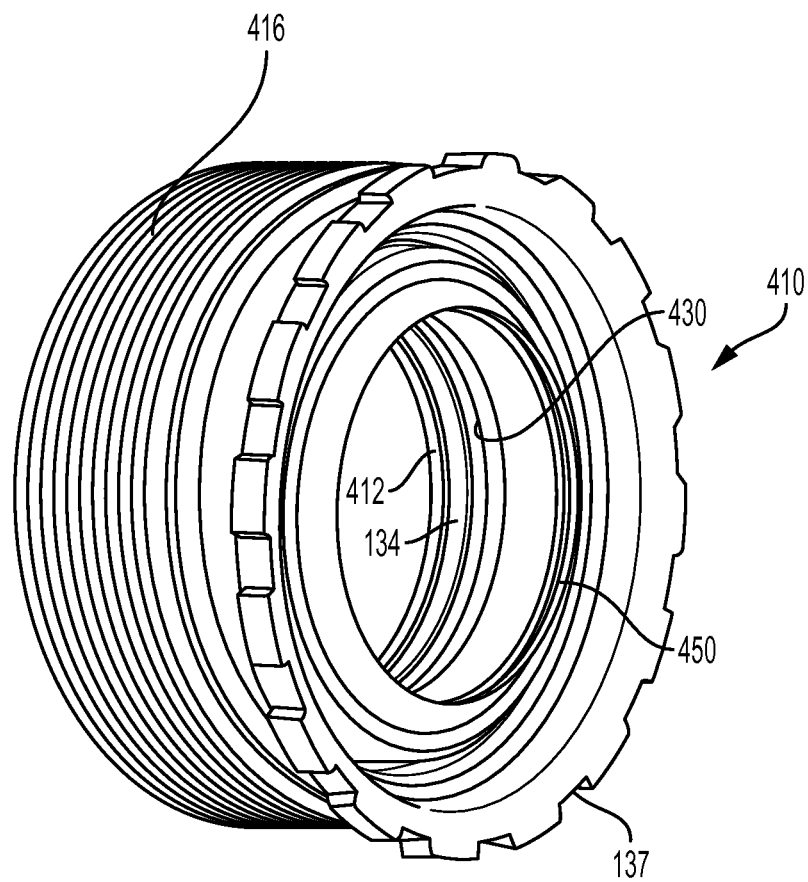
FIG. 8D is a perspective view of a unitized thrust assembly of the axial thrust assembly shown in FIGS. 8A through 8C.

Referring to FIGS. 8A through 8D, another embodiment of a wheel end axial thrust assembly 400 in accordance with the present disclosure includes a radial bearing assembly 140, a snap ring 136, a thrust bearing assembly 130, a retainer nut 410, an inner thrust race 134 and a thrust cup 430 which includes a radially-inwardly depending flange 432 that defines an outer thrust race. As well, thrust cup 430 defines a radially-outwardly depending lip 434 that is received in an annular groove 408 that is defined by the inner surface of retainer nut 410. Retainer nut 410 also defines a radially-inwardly depending lip 412 which has an inner perimeter having a smaller diameter than the outer diameter of inner thrust race 134. As such, inner thrust race 134 and thrust bearing assembly 130 are received between lip 412 and outer thrust race 432 of thrust cup 430 as a unitized thrust assembly, as shown in FIG. 8D, when lip 434 of thrust cup 430 is received in annular groove 408.

This configuration facilitates assembly as retainer nut 410, inner thrust race 134, thrust bearing assembly 130 and thrust cup 430 may be shipped and installed as a unitized assembly. An O-ring 440 is received in an annular groove 442 that is defined by an inner surface of axle tube 102 so that O-ring 440 forms a seal about the outer surface of retainer nut 410. Preferably, an oil seal 450 including an annular body portion 451 and an annular sealing portion 452 is retained within thrust cup 430 by an annular ring 452 that depends radially outwardly from the body portion and engages an annular groove formed by thrust cup 430. Oil seal 450 forms a seal with the outer surface of the axle shaft. As well, outer cup 142 of radial bearing 140 is preferably press-fit inside axle tube 102 axially inwardly of thrust bearing assembly 400, and the axle shaft is able to slide axially with respect to radial bearing 140.

Figure 3:
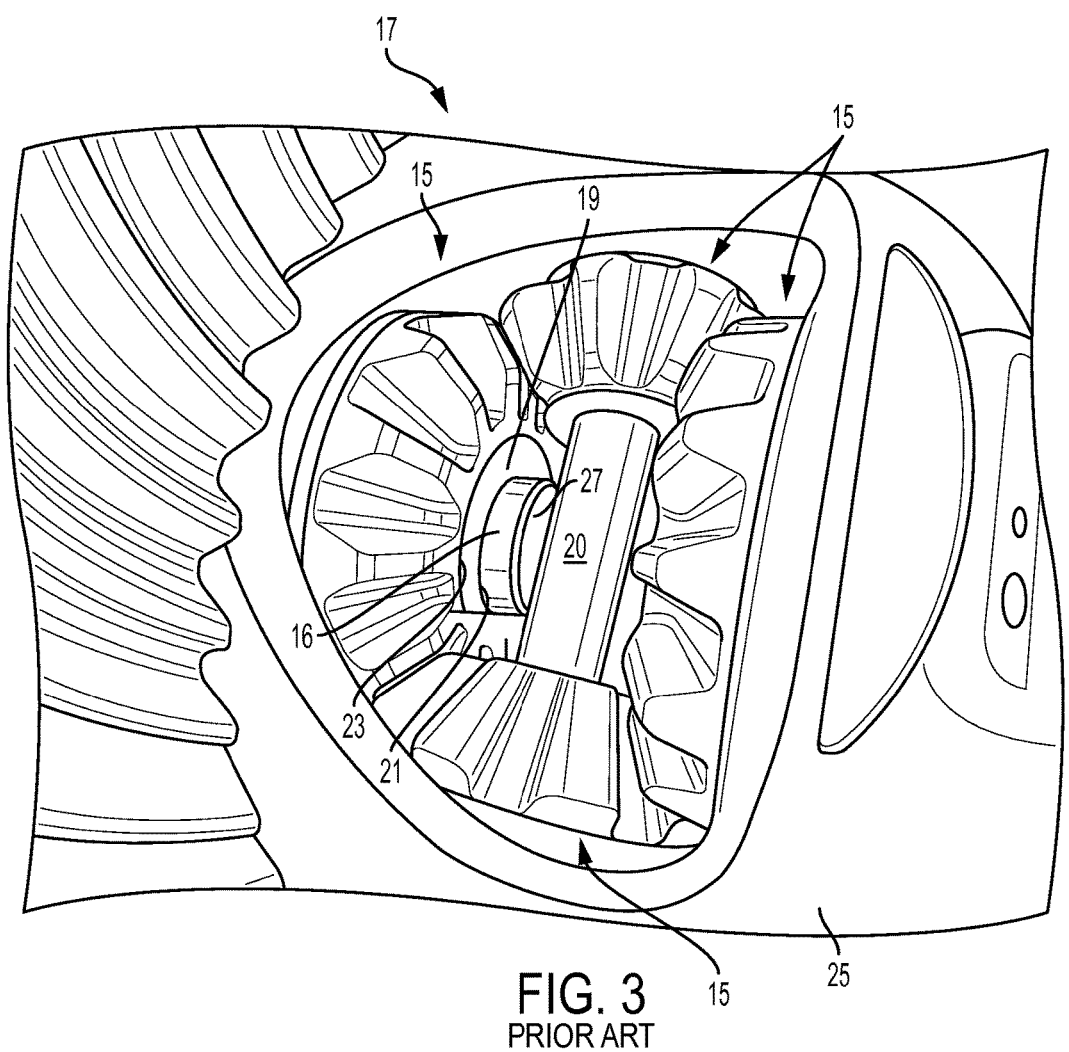
FIG. 3 is a partial perspective view of the prior art axle shaft and differential shown in FIG. 2, including a cross shaft of the differential.
Figure 4:
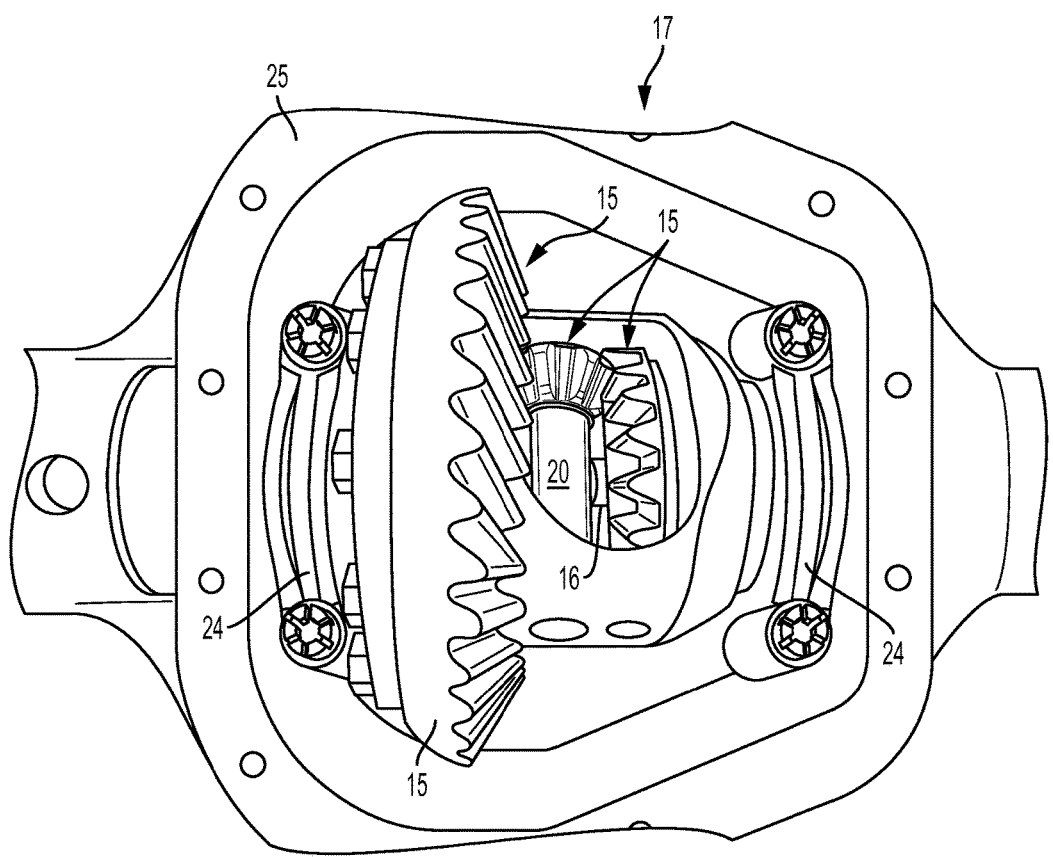
FIG. 4 is a cut away side view of the prior art axle shaft and differential shown in FIG. 2.

During assembly, retainer nut 410 of the unitized bearing assembly is threaded into the distal end of axle tube 102, thereby causing thrust cup 430 to push thrust bearing 130 up against inner thrust race 134 which is, in turn, s pushed up against snap ring 134. As with the previous designs, thrust bearing 130 includes a plurality of needle rollers 132. As snap ring 136 is received in an annular groove 105 formed in the axle shaft, snap ring 136 is pushed axially inwardly so that the end of the inner axle shaft abuts against the differential cross shaft 20 (FIG. 3). Next, retainer nut 410 is unthreaded from the axle tube to provide the desired amount of clearance between the end of the axle shaft and the differential cross shaft when the axle shaft is in its outermost position. In the present case, retainer nut 410 is rotated so that ring lock 138 is able to engage the subsequent lock notch 414 with lock tab 139, which is typically the one that is next to the notch that is engageable when the axle shaft abuts cross shaft 20. Ring lock 138 is then bolted in position to lock retainer nut 410 and, therefore, the unitized bearing assembly components in place.

As best seen in FIG. 8C, during vehicle operations, axial thrust forces acting on axle shaft 106 in the outward direction are transferred to retainer nut 110 by way of snap ring 136. Specifically, snap ring 136 moves outwardly with axle shaft 106 as it is received in annular groove 105 thereof. The outboard end face of snap ring 136 abuts thrust washer 134, which acts as inner thrust race of thrust bearing 130. As such, thrust washer 134 transfers the thrust force to outer thrust race 432, and therefore thrust cup 430, by way of the thrust bearing needle rollers 132. Next, thrust cup 430 transfers the axial thrust force to retainer nut 110 by way of its lip 434 being received in the retainer nut's annular groove 408. In turn, retainer nut 110 transfers the outwardly directed axial thrust force to axle tube 130 by way of the threaded connection therebetween. As previously discussed, inwardly directed axial thrust forces acting on axle shaft 106 are transferred from the innermost end of axle shaft 120 to cross shaft 20 (FIGS. 3 and 4) of the axle's differential.

Figure 9A:
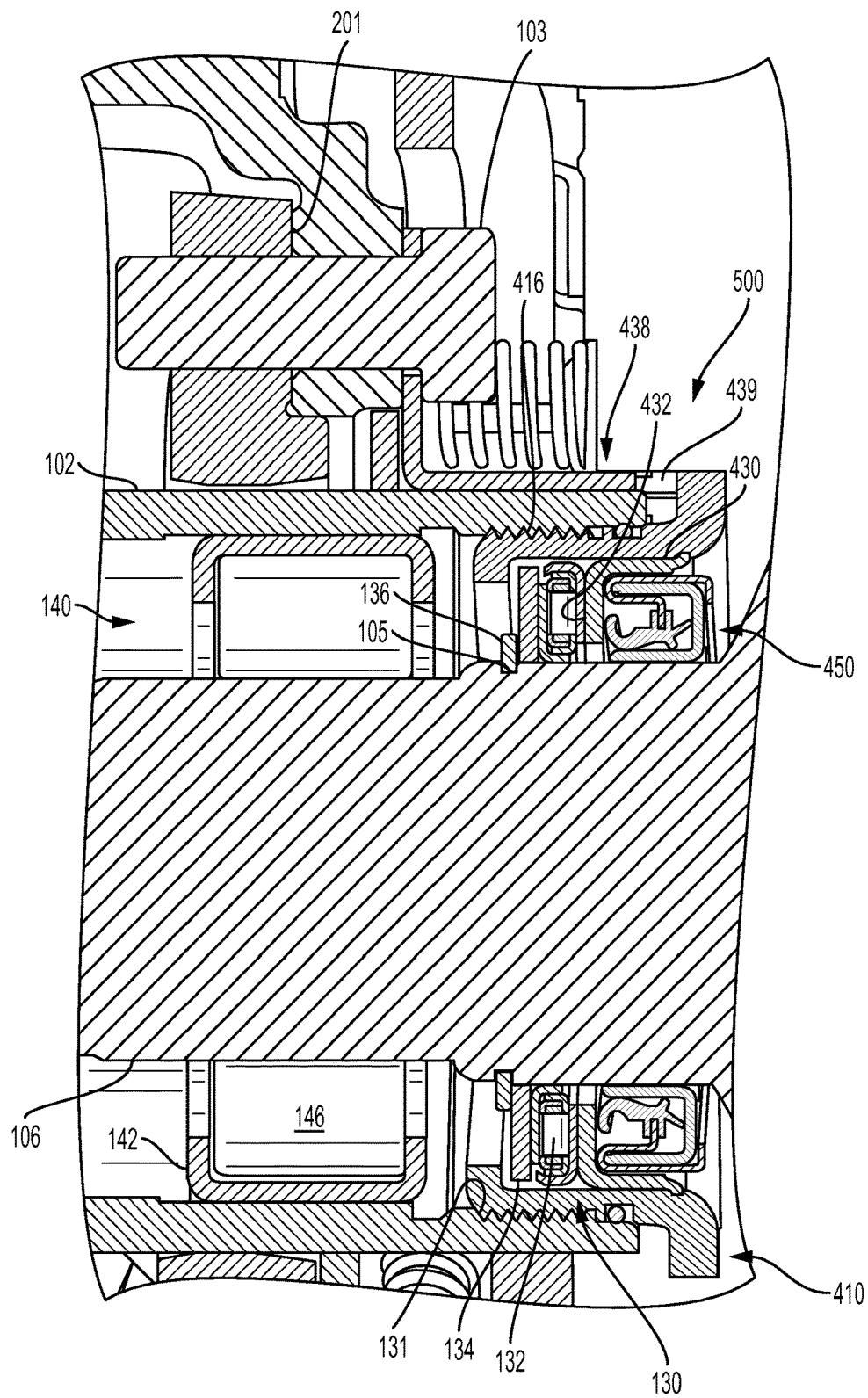
FIG. 9A is a partial cross-sectional view of a wheel end section of a solid axle assembly including a fifth embodiment of an axial thrust assembly in accordance with the present invention.
Figure 9B:
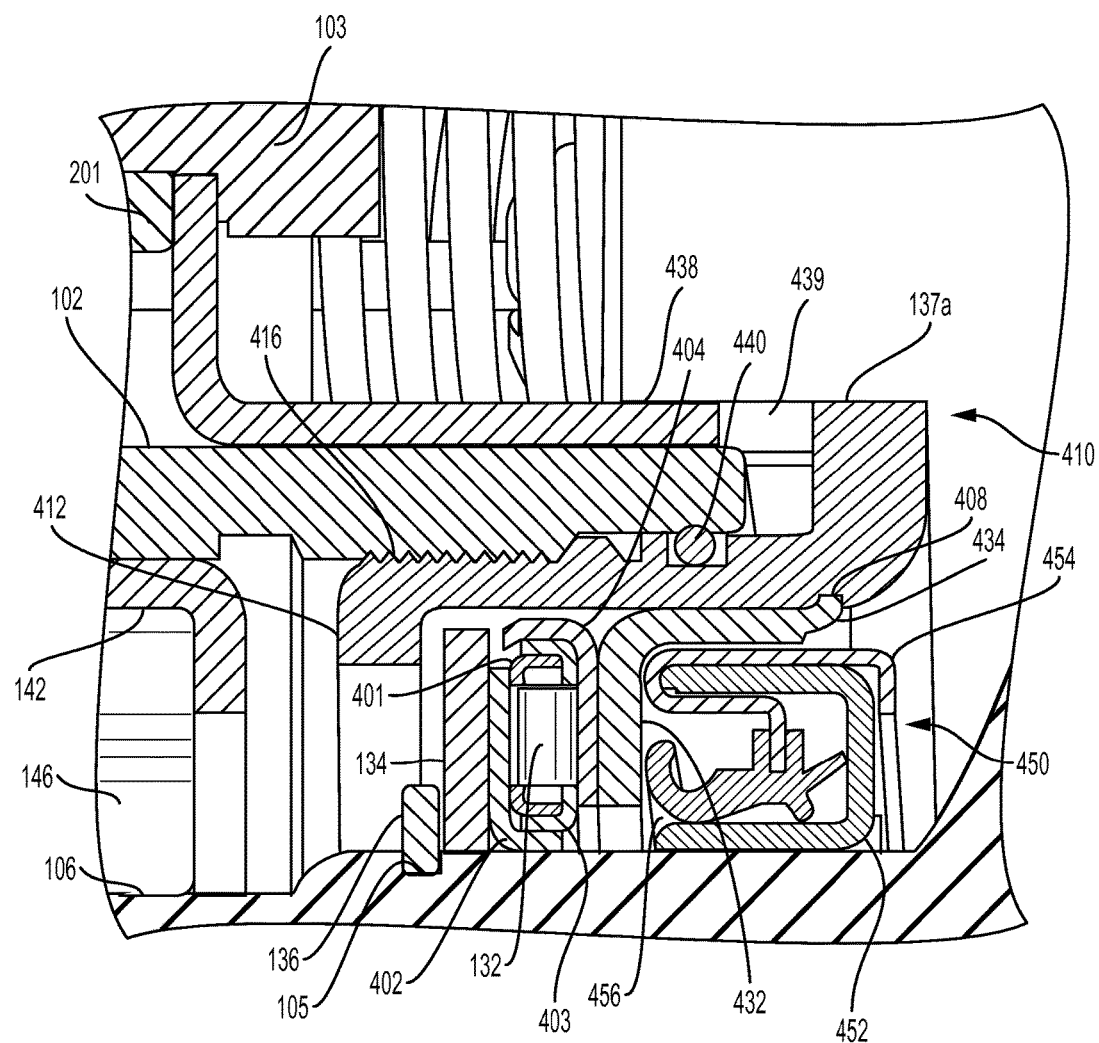
FIG. 9B is a partial cross-sectional view of a wheel end section of a solid axle assembly including a fifth embodiment of an axial thrust assembly in accordance with the present invention.
Figure 9C:
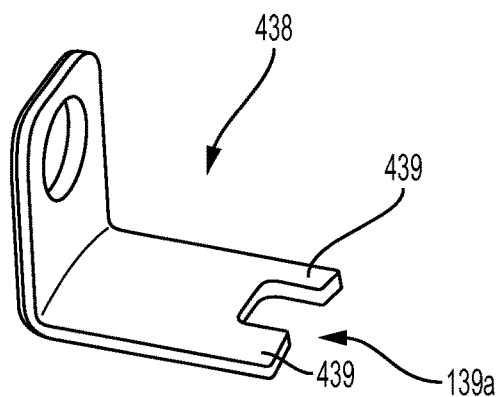
FIG. 9C is a perspective view of a ring lock of the axial thrust assembly shown in FIGS. 9A and 9B.
Figure 9D:
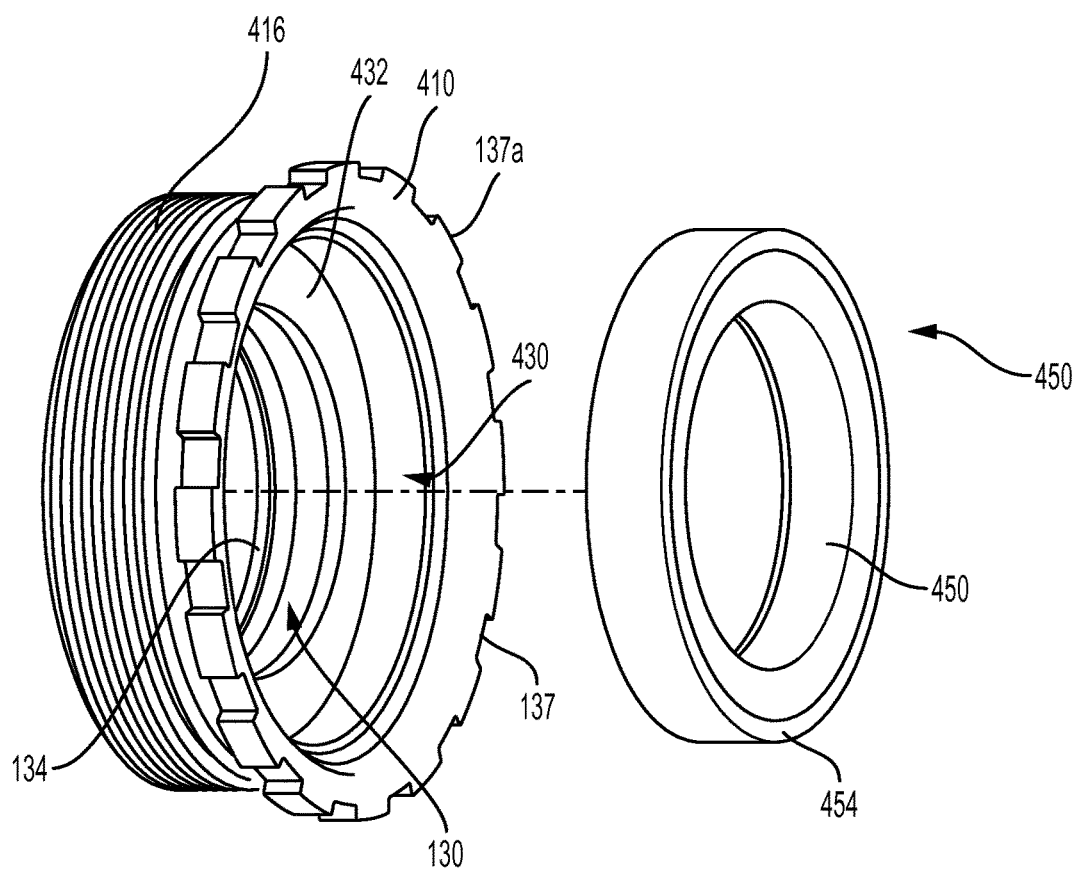
FIG. 9D is a perspective view of a unitized thrust assembly of the axial thrust assembly shown in FIGS. 9A and 9B.

Referring to FIGS. 9A through 9D, another embodiment of a wheel end axial thrust assembly 500 in accordance with the present disclosure includes a radial bearing assembly 140, a snap ring 136, a thrust bearing assembly 130, a retainer nut 410, an inner thrust race 134 and a thrust cup 430 which includes a radially-inwardly depending flange 432. Thrust cup 430 defines a radially-outwardly depending lip 434 that is received in an annular groove 408 that is defined by the inner surface of retainer 410. Retainer 410 also defines a radially-inwardly depending lip 412 which has an inner perimeter having a smaller diameter than the outer diameter of inner thrust race 134. As such, inner thrust race 134 and thrust bearing assembly 130 are received between lip 412 and outer thrust race 432 of thrust cup 430 as a unitized thrust assembly, as shown in FIG. 9D, when lip 434 of thrust cup 430 is received in annular groove 408.

Axial thrust assembly 500 differs only from the fourth embodiment described in regard to FIGS. 8A through 8D in that thrust bearing assembly 130 includes caged needle rollers 146 and dedicated inner and outer raceways 402 and 404, a cartridge-type oil seal 450, and a different ring lock 438. As such, only those components are described at this point. As best seen in FIG. 9B, needle rollers 132 of thrust bearing assembly 130 are contained by first and second cage halves 401 and 403, which are in turn contained within inner and outer raceways 402 and 404. As such, thrust bearing assembly 130 may be assembled as a unitized bearing prior to being installed into axial thrust assembly 500, thereby facilitating assembly.

As best seen in FIG. 9B, oil seal 450 includes a first body portion 452 and a second body portion 454 to which an annular seal 456 is affixed. Second body portion 454 is secured to first body portion 452 so that annular seal 456 is disposed within first body portion 452. As such, annular seal 456 is protected from abrasions, tears, etc., when installing oil seal 450 on axle shaft 406. Oil seal 450 is slidably received in the bore defined by thrust cup 430 in a press-fit.

Referring now to FIG. 9C, ring lock 438 of the present embodiment includes a pair of axially extending tabs 439 defining a notch 139a therebetween. Notch 139a is configured to slideably receive one of a plurality of protrusions 137a that depend radially outwardly from retainer nut 410. After the desired protrusion 137a is determined, as discussed with regard to the previous embodiments, ring lock 438 is secured to brake assembly 201 by a mounting bolt 103.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

What is claimed:
1. An axle assembly for a vehicle, comprising:
a differential assembly;
a first axle tube extending outwardly from a first side of the differential assembly, the first axle tube including a proximal end adjacent the differential assembly, an opposite distal end, and an axle bore extending therebetween;
a first axle shaft rotatably received in the first axle tube, the first axle shaft including a proximal end disposed in the differential assembly, an opposite distal end extending outwardly from the distal end of the first axle shaft, and an annular groove extending radially inwardly from its outer surface;
a retainer nut axially fixed to the distal end of the first axle tube, the retainer nut having an annular flange extending inwardly into the axle bore and defining an annular outer raceway;
a snap ring received in the annular groove of the first axle shaft; and
an axial thrust component disposed in the axle bore of the first axle tube between the snap ring and the outer raceway of the retainer nut.

2. The axle assembly of claim 1, further comprising an annular inner raceway disposed in the axle bore of the first axle tube between the snap ring and the thrust component.

3. The axle assembly of claim 1, further comprising a radial bearing assembly including an outer race and a plurality of roller elements rotatably received therein, the radial bearing assembly being axially fixed within the axle bore of the first axle tube.

4. The axle assembly of claim 1, wherein the axial thrust component further comprises a cage defining a plurality of roller pockets and a plurality of needle rollers, each needle roller being rotatably disposed in a corresponding roller pocket.

5. The axle assembly of claim 1, wherein the retainer nut is in threaded engagement with a threaded portion of the axle bore.

6. The axle assembly of claim 1, wherein a flange plate is non-rotatably fixed with respect to the distal end of the axle tube and the retainer nut is in threaded engagement with the threaded portion of the flange plate.

7. The axle assembly of claim 1, wherein a ring insert is disposed adjacent the distal end of the axle bore and is axially fixed with respect to the axle tube, and the retainer nut is in threaded engagement with an inner surface of the ring insert.

8. An axle assembly for a vehicle, comprising:
a differential assembly;
a first axle tube extending outwardly from a first side of the differential assembly, the first axle tube including a proximal end adjacent the differential assembly, an opposite distal end, and an axle bore extending therebetween;
a first axle shaft rotatably received in the first axle tube, the first axle shaft including a proximal end disposed in the differential assembly, an opposite distal end extending outwardly from the distal end of the first axle shaft, and an annular groove extending radially inwardly from its outer surface;
a retainer nut axially fixed to the distal end of the first axle tube, the retainer nut having an annular flange extending inwardly into the axle bore;
a thrust cup axially fixed to an inner bore of the retainer nut, the thrust cup defining an annular outer raceway;
a snap ring received in the annular groove of the first axle shaft;
an annular inner raceway disposed in the axle bore of the first axle tube adjacent the snap ring;
and an axial thrust component disposed in the axle bore of the first axle tube between the inner raceway and the outer raceway.

9. The axle assembly of claim 8, further comprising a radial bearing assembly including an outer race and a plurality of roller elements rotatably received therein, the radial bearing assembly being axially fixed within the axle bore of the first axle tube.

10. The axle assembly of claim 8, wherein the axial thrust component comprises a plurality of needle rollers.

11. The axle assembly of claim 8, wherein the retainer nut is in threaded engagement with a threaded portion of the axle bore.

12. The axle assembly of claim 8, wherein a flange plate is non-rotatably fixed with respect to the distal end of the axle tube and the retainer nut is in threaded engagement with the threaded portion of the flange plate.

13. The axle assembly of claim 8, wherein a ring insert is disposed adjacent the distal end of the axle bore and is axially fixed with respect to the axle tube, and the retainer nut is in threaded engagement with an inner surface of the ring insert.

* * * * *

UNITED STATES PATENT AND TRADEMARK OFFICE
CERTIFICATE OF CORRECTION

PATENT NO. : 10,183,529 B2
APPLICATION NO. : 15/519386
DATED : January 22, 2019
INVENTOR(S) : Scott Abrahamson Page 1 of 1

It is certified that error appears in the above-identified patent and that said Letters Patent is hereby corrected as shown below:

In the Specification

Column 5, Line 27, delete "rube" and insert --tube--.

Column 7, Line 12, delete "s" and insert --is--.

Column 7, Line 55, delete "retainer" and insert --retainer nut--.

Column 7, Line 55, delete "Retainer" and insert --Retainer nut--.

Signed and Sealed this
Twentieth Day of August, 2019

Andrei Iancu
*Director of the United States Patent and Trademark Office*